No. 727,477. Patented May 5, 1903.

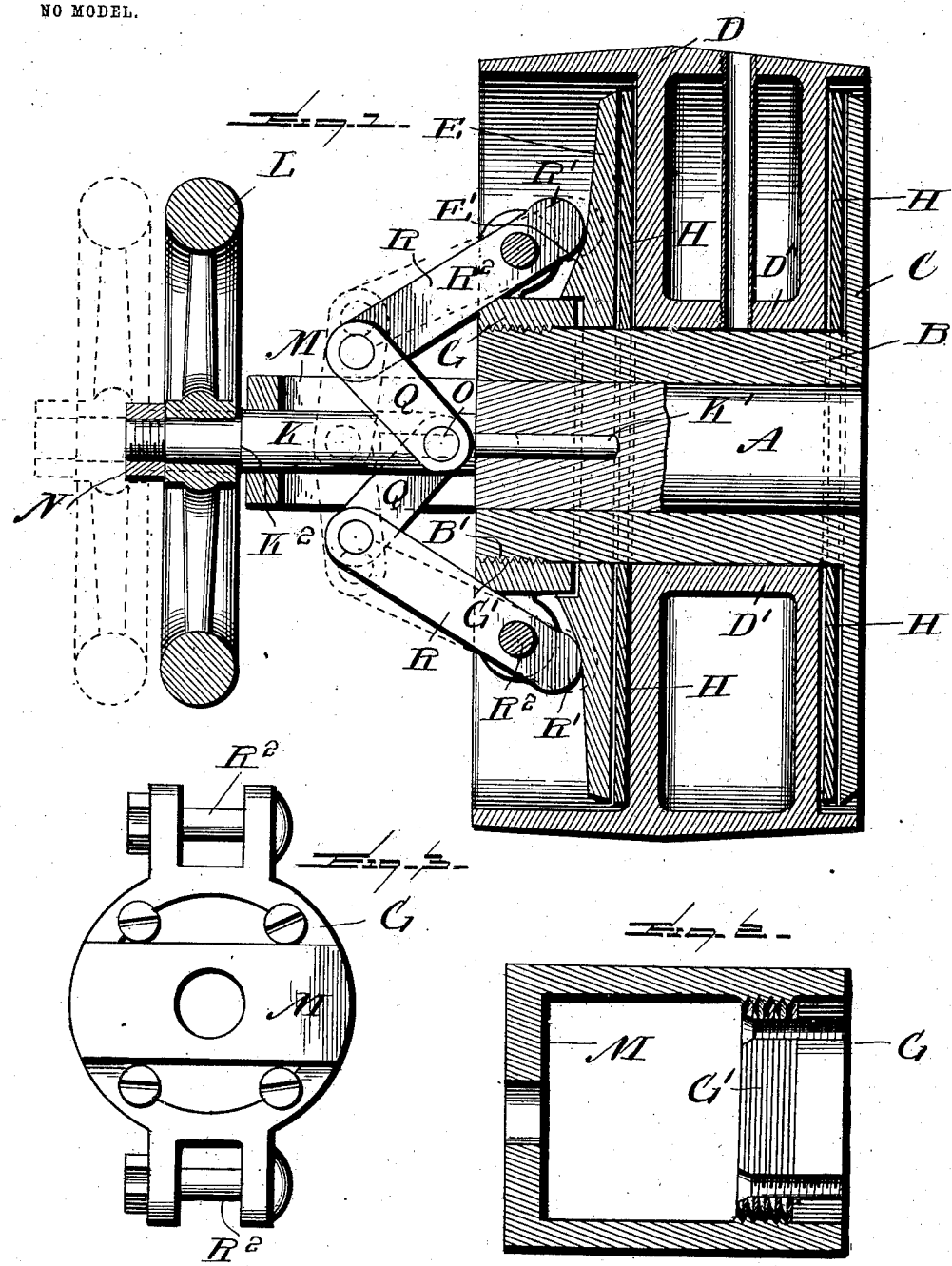

UNITED STATES PATENT OFFICE.

GEORGE W. STARR AND JOHN H. COGSWELL, OF HAVANA, ILLINOIS.

FRICTIONAL CLUTCH APPARATUS.

SPECIFICATION forming part of Letters Patent No. 727,477, dated May 5, 1903.

Application filed October 16, 1902. Serial No. 127,508. (No model.)

*To all whom it may concern:*

Be it known that we, GEORGE W. STARR and JOHN H. COGSWELL, citizens of the United States, residing at Havana, in the county of Mason and State of Illinois, have invented certain new and useful Improvements in Frictional Clutch Apparatus; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in frictional clutch apparatus adapted for attachment to a shaft and designed for use particularly with gasolene-engines and also between the ends of shafts by means of a sleeve and lever to shift the same.

More specifically, our invention comprises a hollow flanged hub portion adapted for direct connection with the shaft and on which a pulley is loosely mounted, which is engaged by a frictional disk actuated by means of a toggle-joint apparatus, which enables the disk to be securely forced against the pulley in order to cause the latter to rotate with the hub and shaft, thereby enabling the shaft to drive a belt at full force of the shaft.

The invention consists, further, in various details of construction and combinations of parts, which will be hereinafter fully described and then specifically defined in the appended claims.

The invention is illustrated in the accompanying drawings, which, with the letters of reference marked thereon, form a part of this application, and in which drawings—

Figure 1 is a vertical central sectional view through a hub, pulley mounted thereon, and frictional clutch mechanism carried by the shaft and hub. Fig. 2 is a sectional detail view taken in the plane at right angles to the section shown in Fig. 1 and centrally through the shaft, and Fig. 3 is a vertical sectional view taken on line 3 3 of Fig. 1.

Reference now being had to the details of the drawings by letter, A designates a shaft, and B a hollow hub, which is fastened to rotate with said shaft and is provided at one end with an integral plate C.

D designates a pulley having a hub portion D' with a central bearing-aperture, said pulley being loosely journaled about the circumference of the hub B. Also loosely journaled upon the circumference of the hub B is a frictional plate E, the outer face of which is slightly tapering or conical-shaped, as shown, and adjacent to the central aperture in said frictional plate is an annular-shouldered portion E', provided for the purpose of receiving the inner annular portion of the collar G, which latter is interiorly threaded, as at G', and adapted to be adjusted on the threads B' of the hub B, as clearly shown in Fig. 1 of the drawings. By reason of the construction of said collar and frictional plate, as shown and described, it will be observed that said collar may be adjusted upon the threads of the hub, and the recessed portion of said frictional plate allowing the inner end of the collar to enter the same.

Interposed between the frictional plate E and the adjacent parallel wall of the hub portion of the pulley and also between the disk or plate C and the opposite wall of the pulley are diposed the frictional disks H, which may be made of roughened paper or other suitable substance having frictional surfaces, which will cause the adjacent clamping-faces to rotate together when pressure is applied by the frictional plates.

Mounted upon the bar K, which has its inner end contracted, as at K', and adapted to be guided longitudinally in an aperture in the end of the shaft, is a hand-wheel L, which is journaled loosely upon a contracted portion of said bar, and a nut N is mounted on the threaded end of said bar and adapted to hold the hand-wheel upon the same and adjacent to a shouldered portion $K^2$ of said bar. The bar K is mounted in an aperture in the projecting part of the shell M, which is integral with the collar G, which rotates with the shaft, and pivotally mounted on a pin O, passing through said bar, are the toggle-links Q, which in turn have pivotal connection with the links R, the free ends of which are provided with rounded extensions R', designed to bear against the outer conical faces of the frictional plate E. Said links R are mounted on pins R², carried by extensions on the collar G.

From the foregoing it will be observed that when the frictional plates C and E are held away from the walls of the pulley or the friction-disk is interposed between the walls of the pulley in said plates the pulley will remain idle; but when it is desired to throw the pulley into connection with and cause the same to rotate with the shaft the operator, by merely pulling outward on the hand-wheel, will cause the plates C and E to be thrown toward each other and to securely clamp the friction-disk against the walls of the pulley. By reason of the toggle-link connections the free ends of the link R will bear with great force upon the inclined outer face of the plate E, drawing and holding said plates E and C against the frictional disks, thus enabling the pulley to drive the belt with all the power of the driven shaft. By pushing in upon the hand-wheel, which remains idle upon the rotating bar and shaft, the frictional contact between the plates and the pulley may be broken and the pulley stopped.

While we have shown the certain detailed construction and mechanism embodying our invention, it will be understood that we may make alterations and changes in the construction of the apparatus without departing from the spirit of the invention.

Having thus fully described our invention, what we claim as new, and desire to secure by Letters Patent, is—

1. A frictional clutch apparatus comprising, in combination with a shaft, a hollow hub rotating therewith, a friction-plate fixed to said hub, a pulley loosely journaled upon said hub, a loosely-mounted friction-plate carried by said hub, a collar adjustably held upon the hub and carrying toggle-links, and a longitudinally-movable bar adapted to actuate the toggle-links to throw the friction-plates against the pulley, thereby causing the latter to rotate with the shaft, as set forth.

2. A frictional clutch apparatus comprising, in combination with a shaft, a hub keyed to rotate therewith and provided with a fixed plate, a pulley loosely journaled on said hub, a friction-plate also loosely journaled upon the hub, a collar having a bore with interior threads adapted to be fitted over the threads on the circumference of said hub, toggle-links pivoted on ears projecting from said collar, the free ends of said links beyond their pivotal points adapted to bear against the outer inclined face of said loosely-mounted friction-plate, and means actuating said toggle-links, whereby the friction-plates may be clamped against the pulley to cause the latter to rotate with the shaft, as set forth.

3. A frictional clutch apparatus, comprising, in combination with a shaft, a hub rotating therewith and having a fixed frictional plate thereon, a pulley loosely mounted upon said hub, a friction-disk also loosely journaled upon the hub and having its outer face inclined or conical shaped, a collar threaded over the circumference of the hub, toggle-links pivotally mounted in ears formed integral with said collar, the inner free ends of said links beyond their pivotal points being rounded and adapted to bear against the conical outer face of said loosely-journaled friction-plate, the inner end of said collar adapted to enter an annular recess in the outer face of said loosely-mounted friction-plate, and means for actuating said toggle-links, as set forth.

4. A frictional clutch apparatus comprising, in combination with a shaft, a hollow hub mounted on and rotating therewith, an integral friction-plate upon said hub, a pulley loosely mounted upon the hub, a friction-disk also loosely journaled upon the hub, a collar having threaded connection with the circumference of the shell, toggle-links pivoted to said collar and adapted to bear against said loosely-mounted friction-plate, a longitudinally-movable bar having pivotal connection with said links and guided in an aperture in the shaft, and means for imparting a longitudinal movement to said bar, whereby the toggle-links may be thrown against or away from said friction-plates, as set forth.

5. A frictional clutch apparatus comprising, in combination with a shaft, a hub mounted thereon and rotating therewith, a friction-plate integral with said hub, a pulley loosely mounted upon the hub, a friction-plate also journaled upon the circumference of the hub, a shell having an interior-threaded portion fitted over the circumference of the hub, a longitudinally-movable rod guided in the hole in the shaft and in said shell, a pivotal pin carried by said rod, and toggle-link connections between said pin and ears formed integral with said collar, the free ends of said toggle-links adapted to bear against the outer face of said loosely-journaled friction-plate, and a hand-wheel loosely mounted upon said rod, whereby the toggle-links may be actuated to throw the friction-plates into clamping relation with the pulley, as set forth.

6. A frictional clutch apparatus comprising, in combination with a shaft, a hub mounted on and rotating therewith, a friction-plate integral with said hub, a pulley loosely mounted upon said hub, a friction-plate also loosely journaled on the hub, a shell interiorly threaded and fitted over the circumference of the hub, a longitudinally-movable bar or rod having a contracted end which is guided in a hole in the end of the shaft, a pivotal pin carried by said bar or rod, toggle-link connections between the same and a collar and ears integral with a collared portion of said shell, the free ends of the toggle-links adapted to frictionally engage the outer circumference of said loosely-mounted friction-plate, a hand-wheel loosely mounted upon the outer end of said rod, whereby the toggle-links may be actuated to force the clamping-plates against the pulley, as set forth.

In testimony whereof we hereunto affix our signatures in presence of two witnesses.

GEORGE W. STARR.
JOHN H. COGSWELL.

Witnesses:
GUY R. WILLIAMS,
H. R. NORTRUP.